F. FERRIN.
Carriers for Lathes.
No. 137,298. Patented April 1, 1873.
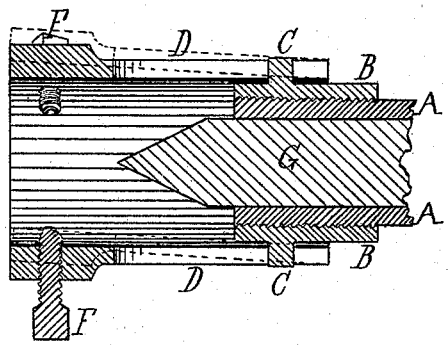
Fig. I.
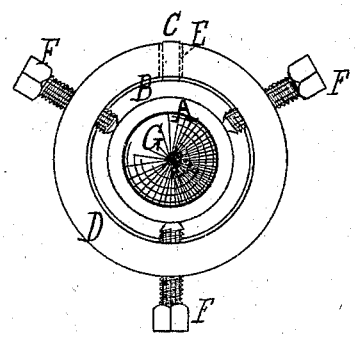
Fig. II.
WITNESSES:
Wm R. Wright
Thos S. Huntington
Frank Ferrin,
by his Atty,
Horace Binney, 3rd.

UNITED STATES PATENT OFFICE.

FRANK FERRIN, OF CAMDEN, NEW JERSEY.

IMPROVEMENT IN CARRIERS FOR LATHES.

Specification forming part of Letters Patent No. 137,298, dated April 1, 1873; application filed February 19, 1873.

*To all whom it may concern:*

Be it known that I, FRANK FERRIN, of the city and county of Camden, in the State of New Jersey, have invented a new and useful Improvement in Carriers for Lathes; and I do hereby declare the following to be a full, clear, and exact description thereof, which will enable others skilled in the art to which it appertains to make and use the same, reference being had to the accompanying drawing which forms a part of this specification, and in which—

Figure 1 is an axial section of my improvement applied to the spindle of a lathe, and Fig. 2 a front end view of the same.

The same parts are denoted by the same letters in both figures.

This invention consists in the combination, with an ordinary lathe spindle and center, of a loose carrier, which can be readily adjusted so as to conform to the obliquity of the work without straining the centers.

A in the drawing represents part of a lathe-spindle, in which is inserted in the usual manner the center G, and on which is screwed the sleeve B, on whose outer surface are formed one or more lugs, C C. D is an exterior sleeve or ring, whose inner diameter is a little greater than the outer diameter of the sleeve B, and which is made with one or more longitudinal slots, E E, corresponding to lugs C C, and extending from the rear end of ring D to within a short distance in rear of the set-screws F F F, which screws work in said ring near the front end thereof, as shown. The slots E are a little wider than lugs C, as shown in dotted lines in Fig. 2, so as to permit the ring D to have a slight movement of rotation round the sleeve B.

In the operation of this improvement, the sleeve B being on the lathe-spindle A, one end of the work to be turned is inserted into the ring D, with its axis coinciding as nearly as possible with the axial line of the said ring, and the screws F are turned so as to hold the work. The ring D is then slipped over the sleeve B, the lugs C entering slots E, the tailstock moved up so as to hold the work between the two centers in the usual manner, and the screws F are again turned so as to clamp the work more tightly, after which the machine may be started.

If the ring were rigidly connected to the sleeve, in case the work should not be correctly centered before the screws F are tightened up, the tightening of the last screw would, unless great care were taken in adjusting the screws, be likely to break one of the centers off. This I prevent by means of the loose connection of the ring and sleeve, resulting from the excess of the inner diameter of D over the outer diameter of B and the slot E being wider than the lug C, so as to permit the ring, when screwed up, to conform to the obliquity of the work, as shown in dotted lines in Fig. 1.

I do not limit myself to the details of construction which I have described, as these may obviously be varied without departing from the substance of my invention. For example, one or two of the screws F might be dispensed with, and V-shaped jaws, inserted in the ring, be substituted therefor; a greater play might be given to the ring D in a radial direction by making a ring on the sleeve B and forming the lugs C thereon; the slots E might be made in sleeve B, and the lugs C on sleeve D; and other variations will readily suggest themselves; but

What I claim as my invention, and desire to secure by Letters Patent of the United States, is—

The combination, with a lathe spindle and center, of the sleeve B provided with one or more lugs, C, and the loose slotted sleeve or ring D provided with set-screws F, all substantially as described.

FRANK FERRIN.

Witnesses:
EDWIN J. HOWLETT,
WM. R. WRIGHT.